US012668096B2

(12) United States Patent
Feng et al.

(10) Patent No.: US 12,668,096 B2
(45) Date of Patent: Jun. 30, 2026

(54) HEATING MODULE FOR RECREATIONAL VEHICLES

(71) Applicant: ZHONGSHAN POWTEK APPLIANCES MFG., LTD., Zhongshan (CN)

(72) Inventors: Xianwei Feng, Zhongshan (CN); Tanghui Zhu, Zhongshan (CN); Song Liu, Zhongshan (CN); Yingheng Tian, Zhongshan (CN)

(73) Assignee: ZHONGSHAN POWTEK APPLIANCES MFG., LTD., Zhongshan (CN)

( * ) Notice: Subject to any disclaimer, the term of this patent is extended or adjusted under 35 U.S.C. 154(b) by 223 days.

(21) Appl. No.: 18/391,458

(22) Filed: Dec. 20, 2023

(65) Prior Publication Data

US 2025/0074138 A1 Mar. 6, 2025

(30) Foreign Application Priority Data

Aug. 30, 2023 (CN) .......................... 202322345008.9

(51) Int. Cl.
  B60H 1/00 (2006.01)
  B60H 1/22 (2006.01)
  B60R 15/02 (2006.01)
(52) U.S. Cl.
  CPC ..... B60H 1/00328 (2013.01); B60H 1/00364 (2013.01); B60H 1/22 (2013.01); B60H 1/2209 (2013.01); B60R 15/02 (2013.01); B60H 2001/224 (2013.01); B60H 2001/2246 (2013.01); B60H 2001/2278 (2013.01)

(58) Field of Classification Search
  CPC .. B60H 1/00328; B60H 1/00364; B60H 1/22; B60H 1/2209; B60H 2001/224; B60H 2001/2246; B60H 2001/2278; B60R 15/02
  See application file for complete search history.

(56) References Cited

U.S. PATENT DOCUMENTS 4,940,024 A * 7/1990 Grabietz ................. F24H 9/139
                                                  122/19.1
6,332,580 B1 * 12/2001 Enander ............. G05D 23/1931
                                                  237/12.3 B
(Continued)

FOREIGN PATENT DOCUMENTS

CN      208760500 U      4/2019
CN      109050387 B      10/2023
(Continued)

*Primary Examiner* — Ljiljana V. Ciric

(57) ABSTRACT

A heating module for recreational vehicles (RVs), including a heat exchanger, a heating water inlet, a heating water outlet and a cold water inlet. The heat exchanger communicates with the heating water inlet. A side of the heat exchanger is provided with a fan to generate air flow, so as to carry the heat generated by the heat exchanger to an interior of the RV. The heating water inlet communicates with a water outlet of a water heater. The heating water outlet is connected with the heat exchanger, and a water pump is provided on a pipeline between the heating water outlet and the heat exchanger. The cold water inlet is configured to be connected with tap water or a water storage tank of the RV. A water flow sensor is provided on the cold water inlet.

4 Claims, 1 Drawing Sheet

(56)                    References Cited

U.S. PATENT DOCUMENTS

| | | | | |
|---|---|---|---|---|
| 7,007,857 | B2 * | 3/2006 | Enander | B60H 1/00364 |
| | | | | 165/41 |
| 7,020,386 | B2 * | 3/2006 | Scime | F24F 1/00 |
| | | | | 392/441 |
| 7,284,710 | B2 * | 10/2007 | Rixen | F24D 12/02 |
| | | | | 237/12.3 B |
| 7,934,664 | B1 * | 5/2011 | Wolter | B60H 1/2209 |
| | | | | 237/12.3 A |
| 8,783,581 | B2 * | 7/2014 | Van Ruijven | F24H 1/08 |
| | | | | 392/441 |
| 9,074,779 | B2 * | 7/2015 | Robinson | F24D 3/08 |
| 9,216,628 | B2 * | 12/2015 | Self | B60H 1/00428 |
| 11,273,685 | B2 * | 3/2022 | Kiarostami | B60H 1/2209 |
| 11,420,496 | B2 * | 8/2022 | Xie | F24H 1/009 |
| 11,486,586 | B2 * | 11/2022 | Dettmering | F24H 15/215 |
| 11,919,364 | B2 * | 3/2024 | Xie | B60H 1/00328 |
| 11,938,788 | B2 * | 3/2024 | Rixen | B60H 1/22 |
| 2006/0024036 | A1 * | 2/2006 | Scime | F24F 1/00 |
| | | | | 392/441 |
| 2006/0196955 | A1 * | 9/2006 | Moxon | B60H 1/2206 |
| | | | | 237/34 |
| 2009/0179079 | A1 * | 7/2009 | Ruijven | B60H 1/00364 |
| | | | | 392/441 |
| 2011/0232862 | A1 * | 9/2011 | Gofton | B60N 3/16 |
| | | | | 236/12.12 |
| 2015/0165871 | A1 * | 6/2015 | Miller | B60H 1/2209 |
| | | | | 237/28 |
| 2016/0342163 | A1 * | 11/2016 | Hazzard | F24H 15/414 |
| 2019/0299741 | A1 * | 10/2019 | Xie | B60H 1/00885 |
| 2019/0308545 | A1 * | 10/2019 | Tagvoian | B60R 15/02 |
| 2022/0134838 | A1 * | 5/2022 | Ungarelli | B60H 1/00478 |
| | | | | 165/202 |
| 2022/0402327 | A1 * | 12/2022 | Xie | F24H 4/04 |
| 2024/0166089 | A1 * | 5/2024 | Tsuda | H01M 10/613 |
| 2024/0308296 | A1 * | 9/2024 | Beloe | B60H 1/32281 |
| 2024/0367480 | A1 * | 11/2024 | Bays | B60L 1/02 |
| 2024/0367486 | A1 * | 11/2024 | Nachawati | B60H 1/143 |
| 2025/0033436 | A1 * | 1/2025 | Park | B60H 1/00921 |
| 2025/0074138 | A1 * | 3/2025 | Feng | B60H 1/00328 |
| 2025/0289281 | A1 * | 9/2025 | Kennedy | B60H 1/00278 |

FOREIGN PATENT DOCUMENTS

| | | | | | |
|---|---|---|---|---|---|
| DE | 3720900 | A | * | 10/1987 | |
| DE | 10215327 | A1 | * | 11/2002 | F24D 11/002 |
| DE | 102017108883 | A1 | * | 11/2017 | B60H 1/00828 |
| DE | 212018000248 | U1 | * | 2/2020 | B60H 1/00364 |
| DE | 112018003284 | T5 | * | 3/2020 | F24H 9/1836 |
| EP | 1176373 | A1 | * | 1/2002 | F25B 29/003 |
| EP | 3549800 | B1 | * | 8/2020 | B60H 1/00007 |
| EP | 4265978 | A1 | * | 10/2023 | F24D 19/1054 |
| GB | 2631924 | A | * | 1/2025 | F24H 15/136 |
| KR | 102561255 | B1 | * | 8/2023 | B60H 1/2209 |
| WO | WO-2020168345 | A1 | * | 8/2020 | F24D 17/0078 |
| WO | WO-2024229293 | A1 | * | 11/2024 | B60H 1/143 |

* cited by examiner

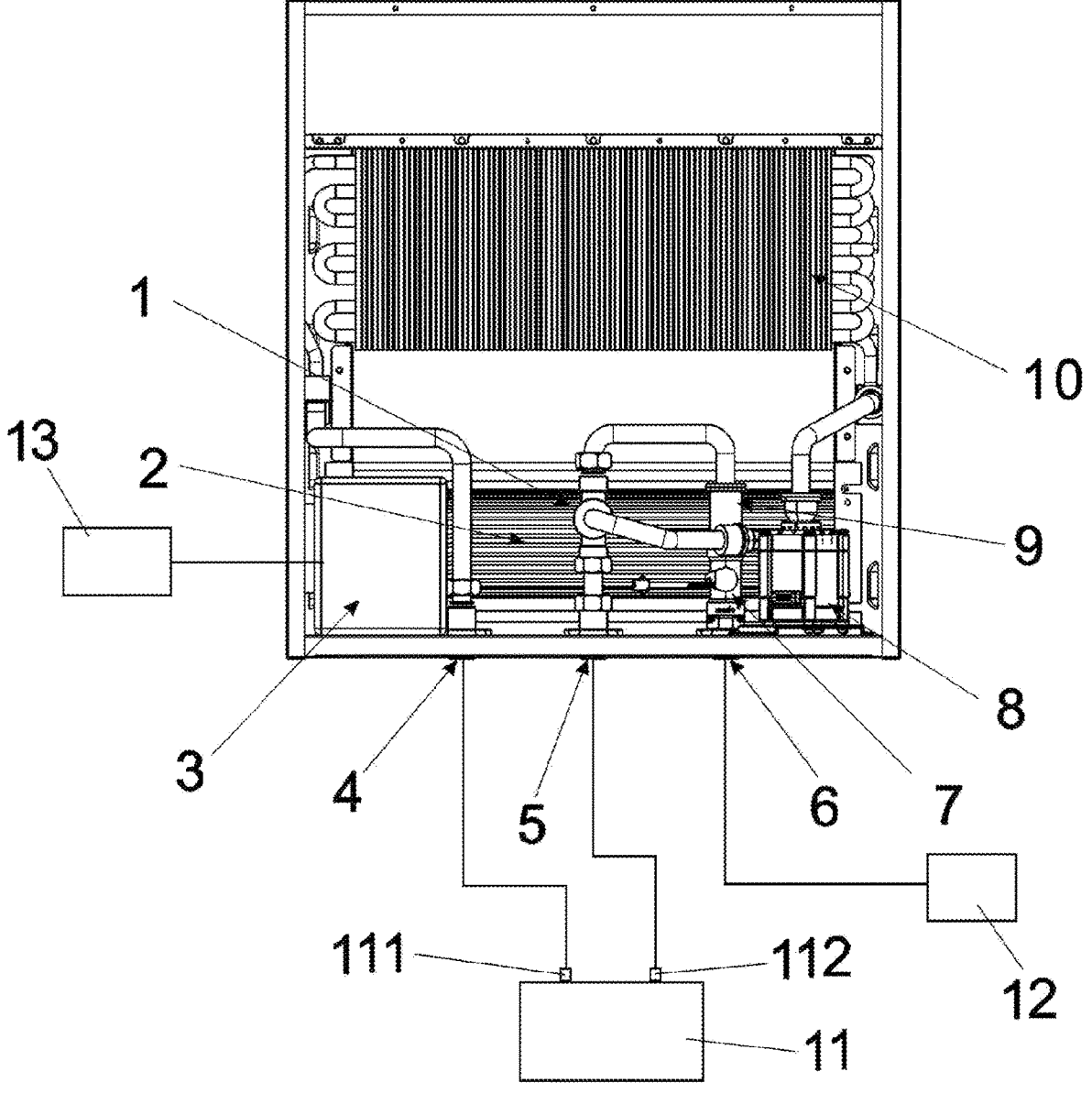

HEATING MODULE FOR RECREATIONAL VEHICLES

CROSS-REFERENCE TO RELATED APPLICATIONS

This application claims the benefit of priority from Chinese Patent Application No. 202322345008.9, filed on Aug. 30, 2023. The content of the aforementioned application, including any intervening amendments thereto, is incorporated herein by reference in its entirety.

TECHNICAL FIELD

This application relates to gas water heaters and gas heating boilers, and more particularly to a heating module for recreational vehicles with a water heater as a heat source.

BACKGROUND

Most of the commercially-available recreational vehicles (RVs) are only equipped with a water heater, which is only used for showering and cannot provide the heating function, so the RVs is not suitable for places with low temperature, thereby limiting the application range and bringing great inconvenience. A heating module for RVs can be compatible with an equipped water heater, and the water heater is used as a heat source to heat the RV without affecting its showering function.

SUMMARY

The present disclosure provides a heating module for recreational vehicles (RVs), which can cooperate with a water heater. Hot water generated by the water heater passes through a copper tube in a heat exchanger of the heating module, and a fan is operated to drive cold wind to pass through an outside of the heat exchanger to undergo heat exchange. After that, the cold wind is converted into hot wind, and the hot wind is transported through an air outlet on a top of the heating module to heat the RV.

In order to arrive at the above purposes, technical solutions of the present disclosure are described as follows.

This application provides a heating module for recreational vehicles (RVs), comprising:

a heat exchanger;
a heating water inlet;
a heating water outlet; and
a cold water inlet;
wherein the heat exchanger communicates with the heating water inlet; a side of the heat exchanger is provided with a fan; the fan is configured to generate an air flow to carry heat generated by the heat exchanger to an interior of an RV; and the heating water inlet communicates with a water outlet of a vehicle-mounted water heater; the heating water outlet is connected with the heat exchanger, and a water pump is provided on a pipeline between the heating water outlet and the heat exchanger; the cold water inlet is configured to be connected with tap water or a water storage tank of the RV; and a water flow sensor is provided on the cold water inlet.

In an embodiment, the heating module further includes a controller. The controller is electrically connected with the fan and the water pump. And the controller is also electrically connected with a temperature sensor in the RV.

In an embodiment, a check valve is arranged on the heating water outlet.

In an embodiment, a check valve is arranged on the cold water inlet.

The operation flow during the heating state: the temperature sensor detects that temperature meets a condition for starting the heating→starting the water pump→the water heater detects a water flow signal to start ignition→starting the fan, and the fan continuously sends the hot wind for heating→the temperature sensor detects that the temperature reaches a preset value→the water pump and the fan are stopped.

The operation flow during the showering state: cold water flows through the water flow sensor of the heating module→detecting a water flow signal→stopping the operation of the water pump and the fan, and the cold water is normally heated through the water heater for showering.

Compared to the prior art, the present disclosure has the following beneficial effects.

(1) The heating module can be directly introduced to the RV equipped with a water heater without changing a structure of the existing water heater.

(2) The heating module can cooperate with the RV water heater to additionally provide the heating function without affecting the showering experience.

(3) The heating module is compatible with the existing RV water heater, and does not need to introduce an additional heat source.

(4) The electric heating (such as an air conditioner) has a large power consumption, and it fails to ensure the timely power supply outdoors. By comparison, the heating module proposed herein utilizes the water heater as a heating source for heating, and the replenishment of liquefied gas is more convenient. Moreover, compared to one power charging, the one replenishment of the liquefied gas can perform heating for a longer period of time.

(5) The heating module does not need connection to an additional gas source, thereby reducing security risks.

BRIEF DESCRIPTION OF THE DRAWINGS

FIG. 1 schematically shows a structure of a heating module for recreational vehicles according to an embodiment of the present disclosure.

DETAILED DESCRIPTION OF EMBODIMENTS

The present disclosure will be clearly and completely described below with reference to the embodiments and accompanying drawings. It's obvious that described herein are only some embodiments rather than all embodiments of the disclosure.

Referring to FIG. 1, the present disclosure provides a heating module for recreational vehicles (RVs), including a heat exchanger 10 and a heating water inlet 4. The heat exchanger 10 communicates with the heating water inlet 4. A side of the heat exchanger 10 is provided with a fan 2; the fan 2 is configured to generate an air flow to carry heat generated by the heat exchanger 10 into an RV. The heating water inlet 4 communicates with a water outlet 111 of a vehicle-mounted water heater 11. The heating module further includes a heating water outlet 5 and a cold water inlet 6. The heating water outlet 5 is connected with the heat exchanger 10, and a water pump 8 is arranged on a pipeline between the heating water outlet 5 and the heat exchanger 10. The cold water inlet 6 is configured to be connected with tap water or a water storage tank 12 of the RV. And a water flow sensor 7 is provided on the cold water inlet 6.

In an embodiment, the heating module further includes a controller 3. The controller 3 is electrically connected with the fan 2 and the water pump 8. The controller 3 is also electrically connected with a temperature sensor 13 in the RV. And the heating module can realize automatic operation through a connection between the controller 3 and the temperature sensor 13.

In an embodiment, a first check valve 1 is arranged on the heating water outlet 5, and a second check valve 9 is arranged on the cold water inlet 6.

The operation flow during the heating state: the temperature sensor 13 detects that temperature meets a condition for starting the heating→the water pump 8 is started→the water heater 11 detects a water flow signal to start ignition→the fan 2 is started, and the fan 2 continuously sends the hot wind for heating→the temperature sensor 13 detects that temperature reaches a present value→the water pump 8 and the fan 2 are stopped.

The operation flow during the showering state: cold water flows through the water flow sensor 7 of the heating module→a water flow signal is detected→the operation of the water pump 8 and the fan 2 are stopped, and the cold water is normally heated through the water heater 11 for showering.

Referring to FIG. 1, the heating water inlet 4 is connected with a water outlet 111 of the water heater 11, and the heating water outlet 5 is connected with the water inlet 112 of the water heater 11. The cold water inlet 6 is connected with the tap water or the water storage tank 12 of the RV. A water flow direction of water in the first check valve 1 and the second check valve 9 is to the heating water outlet 5, and a reverse direction can not flow, so as to effectively avoid backflow of heating and bathroom. The water flow sensor 7 can determine whether there is a demand for domestic hot water, if yes, the water pump 8 and the fan 2 are stopped.

It can be seen that the heating module provided herein effectively solves the Clean version of Specification heating problems of the RVs without affecting the normal showering operation, which greatly improves the users' experience.

It should be noted that the orientation or position relationships indicated by the terms "up", "down", "left", "right", "front", "back" and so on are only used to describe the relative positional relationship or movement in a particular attitude (as shown in the accompanying drawings), and if the particular attitude changes, the directional indication accordingly changes.

Besides, the terms "first" and "second" are only used for description, and can't be understood as indicating or implying relative importance, or implying and indicating the number of referred technical features. Therefore, once a feature is defined with "first" or "second", it may expressly or impliedly indicate the presence of one or more of such features. As used herein, "multiple" means two, three or more unless otherwise clearly stated.

As used herein, unless otherwise expressly specified and limited, the terms "connection", "linkage" and "fixing" should be interpreted in a broad sense. For example, it can be "fixed connection", "removable connection" or "integral connection"; it can be "mechanical connection" or "electrical connection"; it can be "direct connection" or "indirect connection through an intermediate medium"; and it can be internal communication or interaction between two components. For those of ordinary skill in the art, the specific meaning of these terms can be understood in specific cases.

The technical solutions of individual embodiments of the present disclosure can be combined with each other as long as the combined solution can be implemented by those skilled in the art. When the combination is contradictory or cannot be realized, it shall be considered that such combination does not exist, and is not within the scope of this disclosure defined by the appended claims.

What is claimed is:

1. A heating module for recreational vehicles, comprising:
   a heat exchanger;
   a heating water inlet of the heating module;
   a heating water outlet of the heating module; and
   a cold water inlet of the heating module;
   wherein an inlet end of the heat exchanger communicates with the heating water inlet of the heating module; a side of the heat exchanger is provided with a fan; the fan is configured to generate an air flow to carry heat generated by the heat exchanger to an interior of a recreational vehicle; and the heating water inlet of the heating module communicates with a water outlet of a vehicle-mounted water heater;
   the heating water outlet of the heating module communicates with an outlet end of the heat exchanger, and a water pump is provided on a pipeline between the heating water outlet of the heating module and the outlet end of the heat exchanger; and
   the cold water inlet of the heating module is configured to communicate with a tap water source or a water storage tank of the recreational vehicle; the cold water inlet of the heating module communicates with the heating water outlet of the heating module; the heating water outlet of the heating module communicates with a water inlet of the vehicle-mounted water heater; and a water flow sensor is provided on the cold water inlet of the heating module.

2. The heating module of claim 1, further comprising:
   a controller;
   wherein the controller is electrically connected with the fan and the water pump; and the controller is also electrically connected with a temperature sensor in the recreational vehicle.

3. The heating module of claim 1, wherein a check valve is arranged on the heating water outlet of the heating module.

4. The heating module of claim 1, wherein a check valve is arranged on the cold water inlet of the heating module.

* * * * *